Patented June 3, 1930

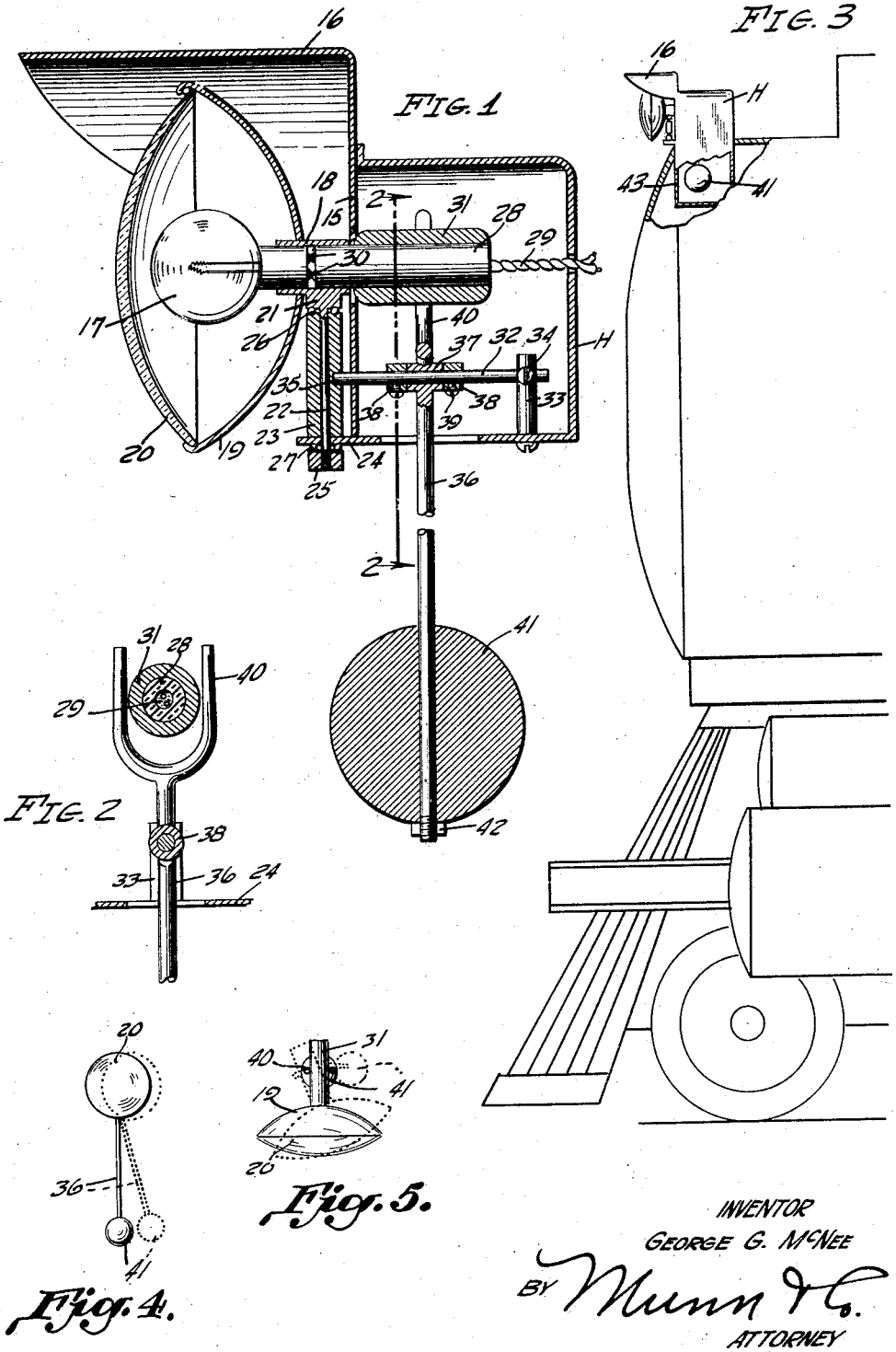

1,761,484

UNITED STATES PATENT OFFICE

GEORGE G. McNEE, OF SANTA BARBARA, CALIFORNIA

DIRIGIBLE HEADLIGHT

Application filed June 12, 1928. Serial No. 284,823.

My invention relates to headlights for locomotives, cars, and the like, and a purpose of my invention is the provision of a headlight having a support which is responsive to the action of gravity to cause the headlight to assume, automatically, positions in which it will illuminate the track in advance of the locomotive or car, when the latter is traversing the curved stretch of track, as well as when traversing a straight stretch of track.

I will describe only one form of dirigible headlight embodying my invention and will then point out the novel features in claims.

In the accompanying drawings:

Figure 1 is a view showing in vertical section one form of dirigible headlight embodying my invention;

Fig. 2 is a vertical sectional view taken on the line 2—2 of Fig. 1 and looking in the direction of the arrows;

Fig. 3 is a vertical sectional view of the headlight in applied position to a locomotive;

Fig. 4 is a view showing the headlight in front elevation and illustrating the pendulous action of the headlight support; and Fig. 5 is a plan view further illustrating the pendulous action of the support.

Referring specifically to the drawings, and particularly to Figs. 1 and 2, my invention in its present embodiment comprises a housing H adapted to be suitably supported on a locomotive or car, as illustrated in Fig. 3.

The front wall 15 of the housing is extended and shaped to provide a hood 16 for the headlight, the latter comprising a lamp 17 removably fitted in a socket 18 and upon which latter is supported a reflector 19 carrying a lens 20. The socket 18 is provided at its lower side with a boss 21, and projecting downwardly from this boss is a shaft 22 extended through a post 23. The post 23 is supported on a forwardly projecting lip 24 of the housing H, and the shaft 22 is extended through this lip and provided with a nut 25 which functions to secure the shaft against upward displacement from the post. Ball-bearings 26 and 27 are interposed between the boss 21 and the upper end of the post 23, and between the lip 24 and the nut 25, all for the purpose of insuring free oscillation of the headlight on the post.

Extending rearwardly from the socket 18 and through a suitable opening in the front wall of the housing H is an electric plug 28 to which conductors 29 are connected, the plug having at its forward end a pair of contacts 30 for engagement with corresponding contacts of the lamp plug. The plug 28 is contained with a sleeve 31, shorter than the plug, so that the forward end of the latter is free to be projected into the socket 18 whereby both the plug and sleeve are supported by the socket.

An axle 32 is supported in horizontal position beneath the sleeve 31, one end of the axle being extended into a post 33 and secured therein by means of a screw 34. The opposite end of the axle is extended through the forward wall of the housing and into a suitable recess 35 in the post 23. A pendulum is mounted for oscillation on the axle 32, and this pendulum comprises a rod 36 having a hub 37 rotatable on the axle 32 and confined against longitudinal movement on the axle by means of a pair of collars 38 secured to the axle by screws 39. Above the hub 37 the rod 36 is constructed to provide a fork-shaped yoke 40, the parallel portions of which are disposed at opposite sides of the sleeve 31. The lower end of the rod 36 is provided with a weight 41 secured thereon by means of a nut 42, and it will be noted, by reference to Fig. 3, that the rod and weight may be disposed in a depending extension 43 of the housing, when the headlight is in applied position to the locomotive.

The operation of the headlight when in applied position to a locomotive or car is as follows:

When the locomotive is traversing a straight stretch of track, the pendulum assumes a perpendicular position in which the yoke 40 engages the sleeve 31 to maintain the lamp and its reflector and lens in such a position that the beam of light emanating therefrom is projected forwardly to illuminate the track in advance of the locomotive. When the locomotive is traversing a curved stretch of track, the pendulum being responsive to the action of gravity swings to the right or left, depending upon the inclination of the curved stretch of track, thereby moving the yoke 40 in a direction opposed to the direction of movement of the weight 41 and thus causing the headlight to be shifted about the shaft 35 as a center in the same direction that the weight 41 is moved, all as clearly illustrated in Figs. 4 and 5.

In this manner the lamp 17 is caused to assume, automatically, a position in which the light beam therefrom is projected at such an angle as to illuminate the curved stretch of track in advance of the locomotive so that clear visibility of the track may be had by the engineer. It will, of course, be understood that when the locomotive is approaching a straight stretch of track when traversing a curved stretch of track the headlight through the action of the pendulum will be gradually restored to its normal position in which its beam is projected directly forward to illuminate a straight stretch of track.

From the foregoing operation it will be manifest that the headlight support is responsive to the action of gravity to assume, automatically, positions in which the track, in advance of the locomotive, is at all times illuminated in contradistinction to a stationary headlight which does not illuminate the track when the latter is traversing a stretch of curved track.

Although I have herein shown and described only one form of dirigible headlight embodying my invention, it is to be understood that various changes and modifications may be made herein without departing from the spirit of the invention and the spirit and scope of the appended claims.

I claim:

1. A dirigible headlight for vehicles comprising an upright shaft having a lamp thereon, a pendulum at one side of the shaft and operatively associated with the latter to shift the lamp in one direction or the other according as the pendulum is swung in one direction or the other, and a mounting for the pendulum comprising an axle, a pendulum hub on the axle, and collars adjustable on the axle to permit adjustment of the hub longitudinally on the axle whereby the pendulum can be adjusted in its operative association with the lamp to vary the relative movement of the lamp in respect to the pendulum.

2. A dirigible headlight for vehicles comprising an upright post, a shaft journaled in the post, a socket on the upper end of the shaft, a lamp carried by the socket and disposed at one side of the shaft, a plug in the socket and extending to the other side of the shaft, a sleeve on the plug, an axle at right angles to the shaft, a pendulum having a rod provided with a hub mounted on the axle, a yoke on the rod above the hub and having portions embracing the sleeve, a weight on the lower end of the rod, and collars embracing the hub and adjustable on the axle for the purpose described.

3. A dirigible headlight for vehicles comprising a housing having a flange at its forward side, a post on the flange, a shaft journaled in the post and having its lower end projecting through the flange, a nut on the lower end of the shaft, ball-bearings interposed between the nut and the flange, a socket on the upper end of the shaft, ball-bearings interposed between the plug and the post, a lamp in the socket at one side of the shaft, a hood on the housing for the lamp, a plug in the socket and extending into the housing, a sleeve on the plug, an axle in the housing below the plug, a post for supporting one end of the axle, the other end of the axle being supported by the first post, a pendulum comprising a rod having a hub on the axle, a fork-shaped yoke on the rod above the hub and having the parallel portions thereof disposed at opposite sides of the sleeve, a weight on the lower end of the rod, and a pair of collars on the axle having set-screws for securing the collars at opposite sides of the hub and to permit adjustment of the collars longitudinally on the axle for the purpose described.

Signed at Santa Barbara, in the county of Santa Barbara and State of California this 1st day of June, 1928 A. D.

GEORGE G. McNEE.